United States Patent
Kwon et al.

(10) Patent No.: US 9,001,776 B2
(45) Date of Patent: Apr. 7, 2015

(54) METHOD AND APPARATUS FOR TRANSMITTING/RECEIVING CONTROL INFORMATION IN A WIRELESS COMMUNICATION SYSTEM

(75) Inventors: Hwan-Joon Kwon, Suwon-si (KR); Hak-Ju Lee, Icheon (KR); Jae-Yoel Kim, Suwon-si (KR); Yeon-Ju Lim, Seoul (KR); Sung-Ryul Yun, Suwon-si (KR); Hong-Sil Jeong, Seoul (KR); Seho Myung, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 893 days.

(21) Appl. No.: 12/396,644

(22) Filed: Mar. 3, 2009

(65) Prior Publication Data

US 2009/0219884 A1    Sep. 3, 2009

(30) Foreign Application Priority Data

Mar. 3, 2008    (KR) .................. 10-2008-0019651

(51) Int. Cl.
- *H04W 72/00* (2009.01)
- *H04W 72/04* (2009.01)
- *H04L 1/00* (2006.01)
- *H04L 5/00* (2006.01)

(52) U.S. Cl.
CPC ......... *H04W 72/0406* (2013.01); *H04L 1/0028* (2013.01); *H04L 1/0072* (2013.01); *H04L 5/0094* (2013.01); *H04L 1/0057* (2013.01)

(58) Field of Classification Search
USPC .......... 370/330, 470, 478, 479; 375/295, 260
See application file for complete search history.

(56) References Cited

U.S. PATENT DOCUMENTS

| | | |
|---|---|---|
| 5,404,355 A | 4/1995 | Raith |
| 6,724,740 B1 | 4/2004 | Choi et al. |
| 8,009,685 B2 | 8/2011 | Himmanen et al. |
| 8,090,033 B2 | 1/2012 | Lee |
| 8,275,081 B2 | 9/2012 | Jiang et al. |
| 2003/0123470 A1 | 7/2003 | Kim et al. |

(Continued)

FOREIGN PATENT DOCUMENTS

| | | |
|---|---|---|
| CN | 101116274 | 1/2008 |
| EP | 1 389 885 | 2/2004 |

(Continued)

OTHER PUBLICATIONS

DVB Digital Video Broadcasting: Frame Structure Channel Coding and Modulation for a Second Generation Digitial Terrestrial Television Broadcasting System (DVB-T2). DVB Document A122r1, Jan. 2008. www.dvb.org/technology/standards/a122r1.tm3980r7.DVB-T2.pdf.*

(Continued)

*Primary Examiner* — Thai Nguyen
(74) *Attorney, Agent, or Firm* — The Farrell Law Firm, P.C.

(57) ABSTRACT

A method and apparatus for transmitting/receiving control information in a wireless communication system are provided, in which physical layer signaling information to be transmitted in a frame is determined, a coded block is generated from signaling information having a fixed number of bits included in the physical layer signaling information, and a frame including the coded block is transmitted. The signaling information having the fixed number of bits includes information required for receiving other signaling information having a variable number of bits.

35 Claims, 8 Drawing Sheets

(56) References Cited

U.S. PATENT DOCUMENTS

| | | | |
|---|---|---|---|
| 2004/0252725 A1 | 12/2004 | Sun et al. | |
| 2006/0114857 A1 | 6/2006 | Czaja et al. | |
| 2007/0061667 A1 | 3/2007 | Lin | |
| 2007/0293171 A1 | 12/2007 | Li et al. | |
| 2009/0103649 A1 | 4/2009 | Vare et al. | |
| 2009/0190677 A1* | 7/2009 | Jokela et al. | 375/260 |
| 2009/0196217 A1* | 8/2009 | Himmanen et al. | 370/328 |

FOREIGN PATENT DOCUMENTS

| | | |
|---|---|---|
| EP | 1 835 649 | 9/2007 |
| JP | 2005-006338 | 1/2005 |
| JP | 2006-324815 | 11/2006 |
| JP | 2008-526093 | 7/2008 |
| JP | 2009-540751 | 11/2009 |
| JP | 2011-512716 | 4/2011 |
| KR | 1020090044515 | 5/2009 |
| RU | 2 149 518 | 5/2000 |
| RU | 2 214 684 | 10/2003 |
| TW | I269535 | 12/2006 |
| TW | I269546 | 12/2006 |
| WO | WO 2006/071052 | 7/2006 |

OTHER PUBLICATIONS

Ulrich Reimers, Digital Video Broadcasting authored by (IEEE Communications Magazine 1998).*

NTT DoCoMo et al.: "Coding Scheme of L1/L2 Control Channel for E-UTRA Downlink", Jun. 27, 2006.

ETSI: "Frame Structure Channel Coding and Modulation for a Second Generation Digital Terrestrial Television Broadcasting System (DVB-T2)", Digital Video Broadcasting, DVB Document A122, pp. 1-165, Jan. 1, 2008.

Digital Video Broadcasting, "Frame Structure Channel Coding and Modulation for a Second Generation Digital Terrestrial Television Broadcasting System (DVB-T2)", DVB Document A122, Jun. 2008.

Digital Video Broadcasting, "Frame Structure Channel Coding and Modulation for a Second Generation Digital Terrestrial Television Broadcasting System (DVB-T2)", DVB Document A122r1, Jan. 2008.

Nokia: "Compact Signalling of Multi-code Allocation for HSDPA, Version 2", 3GPP TSG RAN WG 1 #23 Meeting, TSGR1#(23)02-0018, Jan. 11, 2002.

* cited by examiner

METHOD AND APPARATUS FOR TRANSMITTING/RECEIVING CONTROL INFORMATION IN A WIRELESS COMMUNICATION SYSTEM

PRIORITY

This application claims priority under 35 U.S.C. §119(a) to a Korean Patent Application filed in the Korean Intellectual Property Office on Mar. 3, 2008 and assigned Serial No. 10-2008-0019651, the entire disclosure of which is hereby incorporated by reference.

BACKGROUND OF THE INVENTION

1. Field of the Invention

The present invention generally relates to a method and apparatus for transmitting/receiving control information in a wireless communication system. More particularly, the present invention relates to a method and apparatus for transmitting/receiving physical layer control information in a wireless communication system.

2. Description of the Related Art

Figure 1:
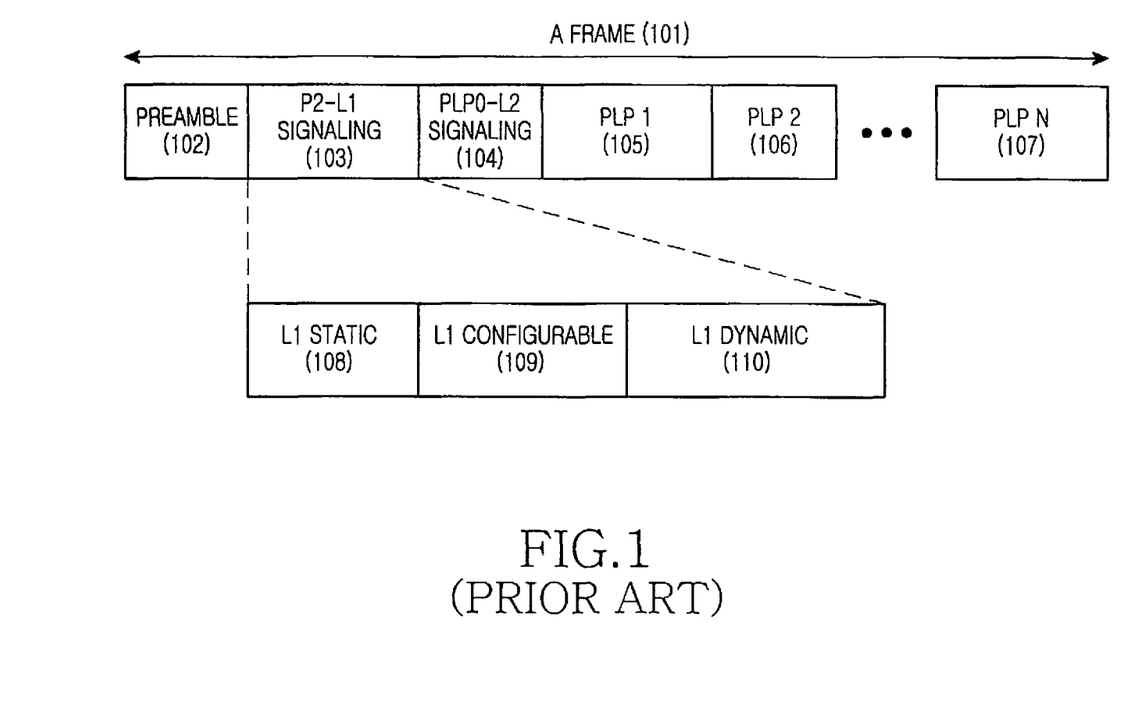
FIG. 1 illustrates a conventional transmission scheme for a frame including control information in a wireless communication system, especially in a wireless digital broadcasting system.

FIG. 1 illustrates a conventional transmission scheme for a frame including control information in a wireless communication system, especially in a wireless digital broadcasting system.

Referring to FIG. 1, reference numeral 101 denotes one frame. The frame 101 includes a preamble 102, Layer 1 (L1) signaling information 103, Layer 2 (L2) signaling information 104, and at least one Physical Layer Pipe (PLP) 105 to 107. The control information can be delivered in the preamble 102, the L1 signaling information 103, and the L2 signaling information 104, and data is carried in the PLPs 105 to 107.

The preamble 102 is used for time and frequency synchronization and frame synchronization at a receiver. The L1 signaling information 103 is referred to as P2 because it is transmitted in a P2 symbol. P2 represents L1, i.e. physical layer signaling information.

The L1 signaling information 103 includes static, configurable, and dynamic information as indicated by reference numerals 108, 109 and 110, respectively. The static information 108 is almost constant in time, including information about a cell Identifier (ID), a network ID, the number of Radio Frequency (RF) channels, a frame length, and the positions of pilot subcarriers. The configurable information 109 does not change in every frame, but includes information that can be configurable in an upcoming frame. Therefore, the configurable information 109 includes information about a service ID, a modulation scheme, and a code rate used for transmitting service data.

The dynamic information 100 may vary in every frame, including the position of each PLP carrying service data in a current frame, i.e. the start and end of each PLP. In FIG. 1, the L2 signaling information 104 is signaling information about Layer 2 (L2), that is, a Medium Access Control (MAC) layer. A PLP carrying the L2 signaling information 104 is referred to as PLP 0. PLP 0 includes information about the connection between a PLP and a broadcasting service, describing a PLP in which a particular service is received. The PLPs 105 to 107, PLP 1 to PLP N, convey at least one service channel. As the PLPs 105 to 107 carry actual broadcasting data, they are also referred to as data PLPs.

To receive a specific broadcasting service channel, a receiver acquires frame synchronization from the preamble 102 and achieves information about a data transmission scheme and a frame length from P2, that is, the L1 signaling information 103. The receiver then detects PLPs carrying the intended service channel from PLP0, that is, the L2 signaling information 104, and receives broadcasting data in the PLPs.

In the case of control information such as signaling information, it may include a large number of dummy bits during encoding in the wireless communication system. These dummy bits dissipate communication resources. Accordingly, there exists a need for a method for encoding control information to efficiently use communication resources.

SUMMARY OF THE INVENTION

An aspect an embodiment of the present invention is to address at least the problems and/or disadvantages and to provide at least the advantages described below. Accordingly, an aspect of an embodiment of the present invention is to provide a method for generating a plurality of coded blocks by efficiently encoding control information and a transmission/reception method and apparatus using the same in a wireless communication system.

Another aspect of an embodiment of the present invention provides a method for generating a plurality of coded blocks by efficiently Low Density Parity Check (LDPC)-encoding control information and a transmission/reception method and apparatus using the same in a wireless communication system.

A further aspect of an embodiment of the present invention provides a method for generating coded blocks distinguishably according to the type of control information and a transmission/reception method and apparatus using the same in a wireless communication system.

In accordance with an aspect of an embodiment of the present invention, there is provided a method for transmitting control information in a wireless communication system, in which physical layer signaling information to be transmitted in a frame is determined, a coded block is generated independently from signaling information having a fixed number of bits included in the physical layer signaling information, and a frame including the coded block is transmitted. The signaling information having the fixed number of bits includes information required for receiving other signaling information having a variable number of bits.

In accordance with another aspect of an embodiment of the present invention, there is provided an apparatus for transmitting control information in a wireless communication system, in which an encoder encodes received information in a predetermined coding scheme, a transmitter transmits a frame over a wireless network, and a controller controls the encoder to generate a coded block by encoding signaling information having a fixed number of bits included in the physical layer signaling information and controlling the transmitter to transmit a frame including the coded block. The signaling information having the fixed number of bits includes information required for receiving other signaling information having a variable number of bits.

In accordance with a further aspect of an embodiment of the present invention, there is provided a method for transmitting control information in a wireless communication system, in which physical layer signaling information to be transmitted in a frame is determined, at least one coded block is generated from signaling information having a variable number of bits included in the physical layer signaling information, and a frame including the at least one coded block is transmitted. The frame includes other signaling information having a fixed number of bits required for receiving the signaling information having the variable number of bits.

In accordance with still another aspect of an embodiment of the present invention, there is provided an apparatus for transmitting control information in a wireless communication system, in which an encoder encodes received information in a predetermined coding scheme, a transmitter transmits a frame over a wireless network, and a controller controls the encoder to at least one coded block by encoding signaling information having a variable number of bits included in the physical layer signaling information and controls the transmitter to transmit a frame including the at least one coded block. The frame includes other signaling information having a fixed number of bits required for receiving the signaling information having the variable number of bits.

In accordance with yet another aspect of an embodiment of the present invention, there is provided a method for receiving control information in a wireless communication system, in which signaling information having a fixed number of bits is received in a coded block of a received frame, and signaling information having a variable number of bits in at least one coded block of the received frame is decoded using the signaling information having the fixed number of bits.

In accordance with yet further aspect of an embodiment of the present invention, there is provided an apparatus for receiving control information in a wireless communication system, in which a receiver receives a frame including physical layer signaling information over a wireless network, a decoder decodes received information in a predetermined coding scheme, and a controller controls the decoder to decode signaling information having a fixed number of bits included in the physical layer signaling information and to decode signaling information having a variable number of bits included in the physical layer signaling information using the decoded signaling information having the fixed number of bits.

BRIEF DESCRIPTION OF THE DRAWINGS

The above and other objects, features and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 2:
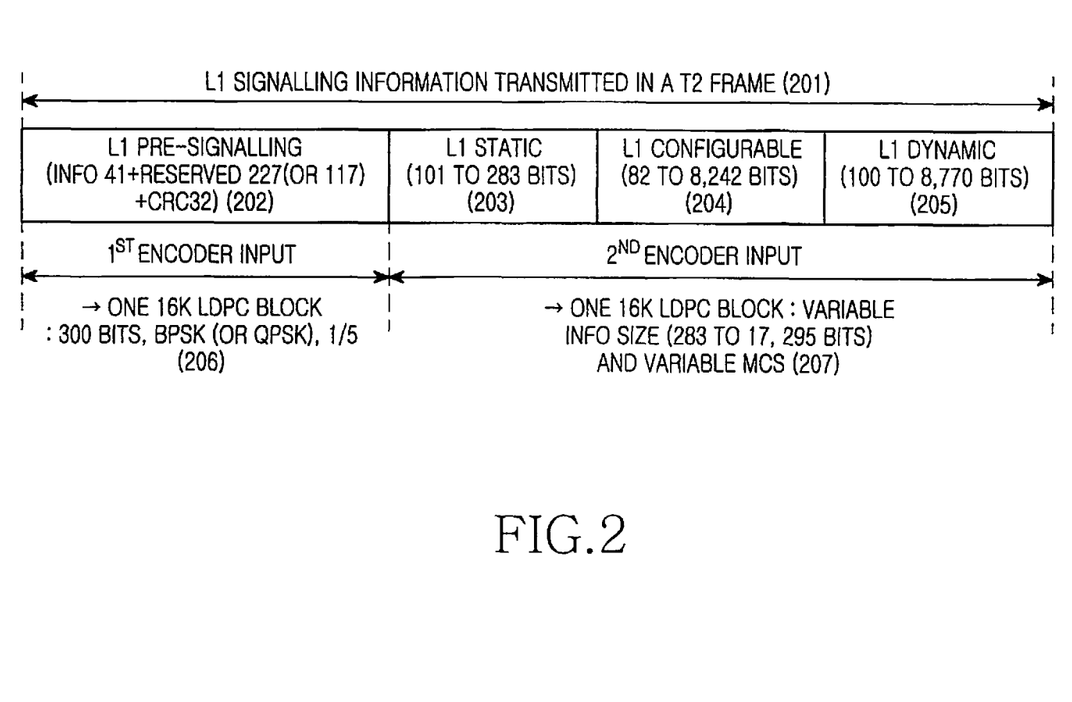
FIG. 2 illustrates a method for encoding control information in a wireless communication system to which the present invention is applied.

FIG. 2 illustrates a method for encoding control information in a wireless communication system to which the present invention is applied. Specifically, the control information is the L1 signaling information illustrated in FIG. 1.

Referring to FIG. 2, L1 signaling information further includes L1 pre-signaling information 202 in addition to L1 static information 203, L1 configurable information 204, and L1 dynamic information 205 that have been described before with reference to FIG. 1. The L1 pre-signaling information 202 provides information about a transmission scheme for the L1 static information 203, the L1 configurable information 204, and the L1 dynamic information 205. That is, the L1 pre-signaling information 202 indicates subcarriers, modulation schemes (Quadrature Phase Shift Keying (QPSK), 16-ary Quadrature Amplitude Modulation (16QAM), 64QAM, etc.), and code rates used for the L1 static information 203, the L1 configurable information 204, and the L1 dynamic information 205. While specific numbers of bits are described for the L1 pre-signaling information 202, the L1 static information 203, the L1 configurable information 204, and the L1 dynamic information 205, they are mere examples to which the present invention is not limited.

A transmitter creates a codeword by LDPC-decoding the L1 pre-signaling information 202 independently, as indicated by reference numeral 206 and another codeword by LDPC-encoding the L1 static information 203, the L1 configurable information 204, and the L1 dynamic information 205 collectively, as indicated by reference numeral 207. For the input of a relatively small number of input bits, for example, 200 to 300 bits, the LDPC code generally has poor coding performance.

In the illustrated case of FIG. 2, for the L1 pre-signaling information 202, no more than 41 input bits are added with 227 dummy bits and 32 Cyclic Redundancy Check (CRC) bits. The resulting 300 bits are encoded into one codeword. As described above, as many as 227 bits are used as dummy bits to transmit 73-bit information including the 41-bit L1 pre-signaling information and the 32-bit CRC, which is very inefficient.

In accordance with a control information encoding method of the present invention, a first codeword is generated by encoding the L1 pre-signaling information 202 and predetermined default information of the L1 static information 203 (referred to as default L1 static information) and a second codeword is generated by encoding the remaining additional L1 static information, the L1 configurable information 204, and the L1 dynamic information 205. Notably, the remaining additional L1 static information is optional in the present invention.

Figure 3:
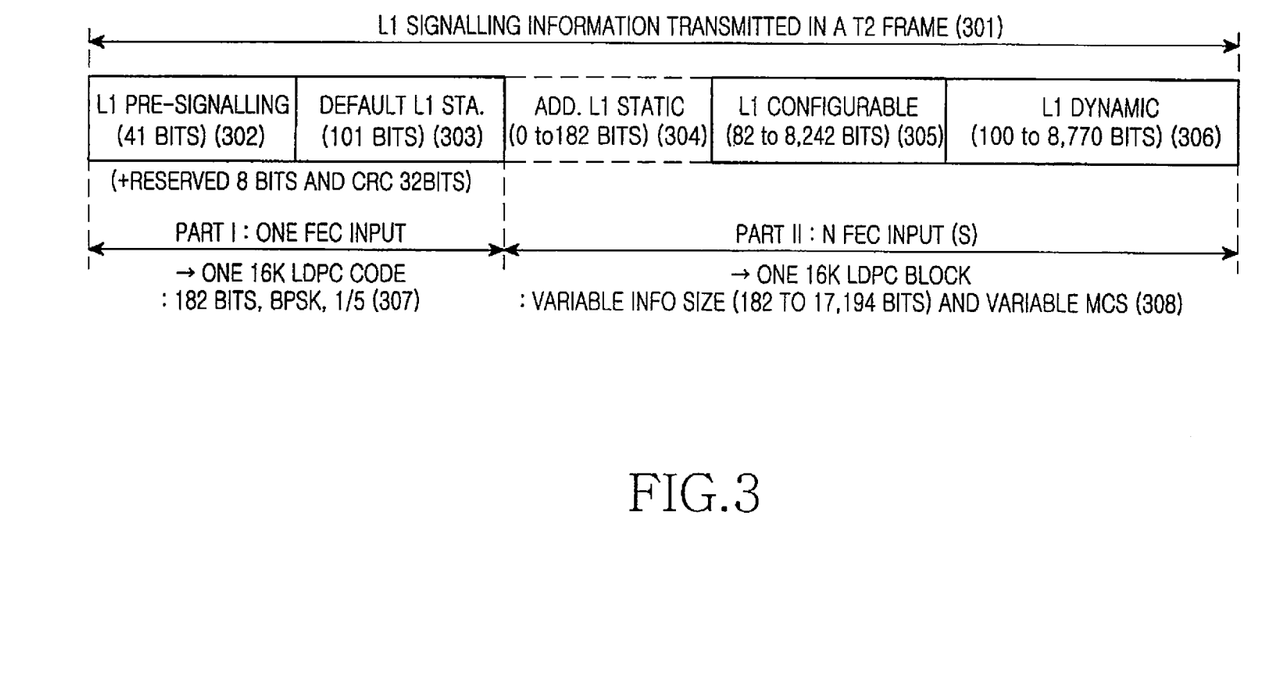
FIG. 3 illustrates a control information encoding method in the wireless communication system according to an embodiment of the present invention.

FIG. 3 illustrates a control information encoding method in the wireless communication system according to an embodiment of the present invention.

Referring to FIG. 3, for encoding control information such as L1 signaling information, a first codeword 307 is generated by encoding L1 pre-signaling information 302 and default L1 static information 303 extracted from L1 static information. An example of the default L1 static information 303 will be described in detail with reference to FIG. 4. The input of the L1 static information for the first codeword 307 is for improving performance by decreasing dummy bits considerably, compared to the conventional technology. The reason for inputting the default L1 static information 303 is to maintain the amount and type of input information of the first codeword.

A second codeword 308 is generated by encoding additional L1 static information 304, L1 configurable information 305, and L1 dynamic information 306. The additional L1 static information 304 is optional, which will be described in detail with reference to FIG. 4. In FIG. 3, LDPC coding is adopted for creating the first and second codewords 307 and 308, by way of example.

Figure 4:
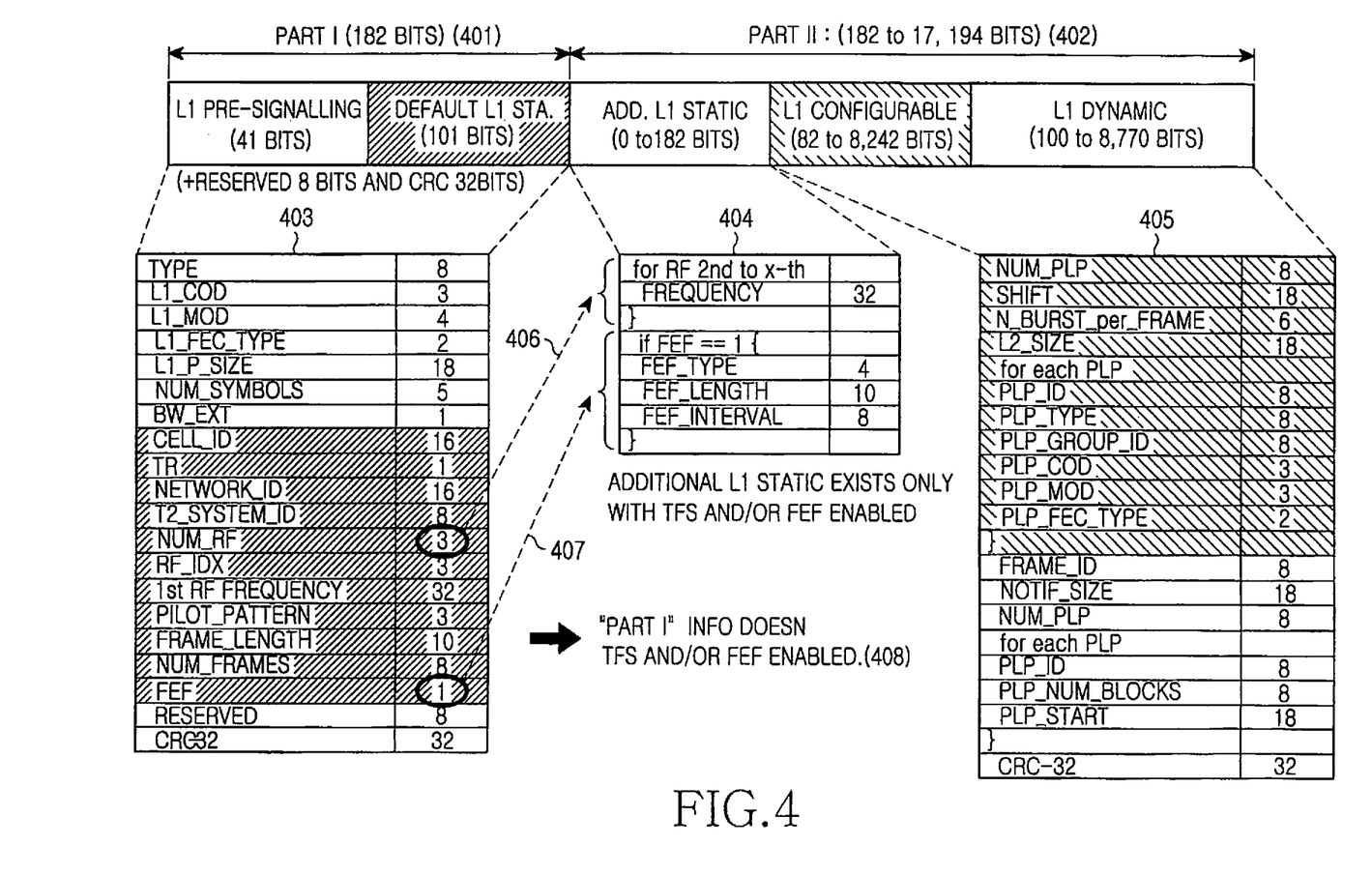
FIG. 4 illustrates the structures of first and second codewords as control information encoded in the method of FIG. 3.

FIG. 4 illustrates the structures of the first and second codewords as control information encoded in the method of FIG. 3.

Referring to FIG. 4, reference numeral 403 denotes an example of L1 pre-signaling information and default L1 static information. Time Frequency Slicing (TFS) represents transmission of one PLP on a plurality of Radio Frequency (RF) channels. In Table 403, NUM_RF at the start of fields indicated by an arrow 406 indicates the number of RF channels carrying one PLP. When one PLP is transmitted on a plurality of RF channels, that is, TFS mode is used, NUM_RF is greater than 1. If one PLP is transmitted on one RF channel, NUM_RF is 1. There are as many main RF_Frequency fields as the value of NUM_RF. RF_Frequency indicates an RF frequency, usually occupying 32 bits. In the present invention, the first of one or more RF_Frequency fields is included in the first codeword. If NUM_RF is greater than 1, as many RF_Frequency fields as "NUM_RF-1" can be included in the second codeword. This configuration of the input information of each codeword can fix the bit numbers and types of the input information of the first codeword.

Main fields of the L1 pre-signaling information listed in Table 403 are "TYPE" indicating the type of a stream transmitted in a frame, "L1_COD" indicating the code rate of Part II information 402, "L1_MOD" indicating the modulation scheme of the Part II information 402, "L1_FEC_TYPE" indicating an L1 Forward Error Correction (FEC) type used for the Part II information 402 (e.g. a 16 k LDPC block), "L1_P_SIZE" indicating the size of the coded and modulated Part II information 402, "BW_EXT" is an indicator specific to a geographical cell in a network, "NETWORK_ID" identifying a current network, "T2_SYSTEM_ID" identifying a system, and "RF_IDX" is the index of an RF channel.

Reference numeral 407 denotes another example of the first and second codeword configuration. In Table 403, FEF is a field indicating whether a Further Extension Frame (FEF) is used. An FEF is a frame defined to allow some frame to be transmitted in a future technology. If FEF is 0, an FEF is not used in the current system. If FEF is 1, an FEF is used in the current system. Control information about Further Extension Frame is added in Table 404. As noted from Table 403, the input information of each codeword is configured such that only necessary information is included in the first codeword when an FEF is not used and additional L1 static information is included in the second codeword when an FEF is used. Hence, the input information of the first codeword is constant in bit number and type.

Main fields of L1 configurable information and L1 dynamic information of Part II listed in Table 405 are "MUM_PLP" indicating the number of PLPs transmitted in a (super)frame, "PLP_ID" is an Identification (ID) specific to a PLP, "PLP_CO" indicating the code rate of the PLP, "PLP_MOD" indicating the modulation scheme of the PLP, "PLP_FEC_TYPE" indicating an FEC type used for the PLP, "PLP_NUM_BLOCKS" indicating the number of FEC blocks included in an interleaved frame of the current PLP, and "PLP_START" indicating the start position of the PLP in the current PLP.

Figure 5:
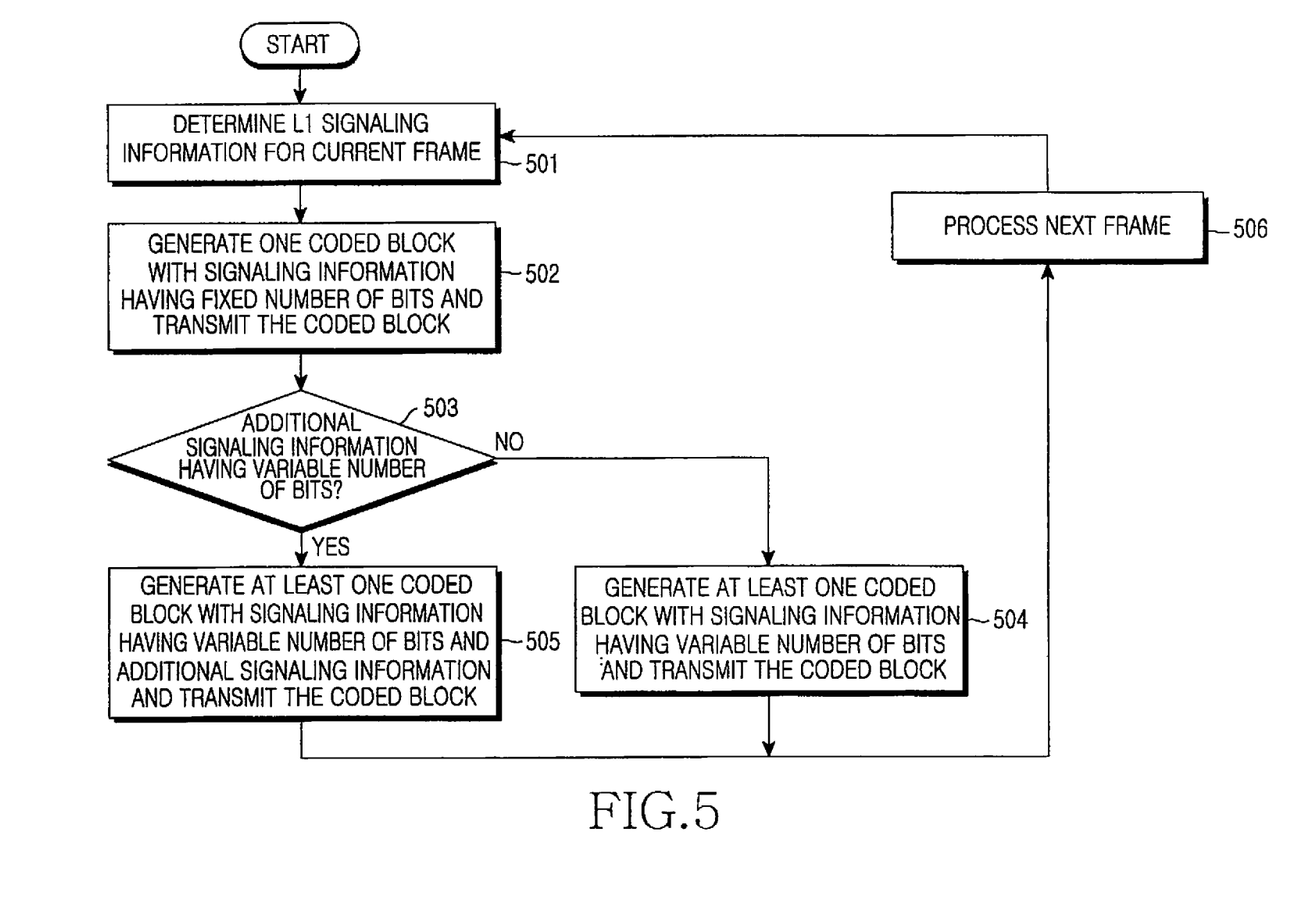
FIG. 5 is a flowchart illustrating a method for transmitting control information in a transmitter in the wireless communication system according to an embodiment of the present invention.

FIG. 5 is a flowchart illustrating a method for transmitting control information in a transmitter in the wireless communication system according to an exemplary embodiment of the present invention.

Referring to FIG. 5, the transmitter generates P2 information (L1 pre-signaling information, L1 static information, L1 configurable information, and L1 dynamic information) as control information for a current frame in step 501. The transmitter generates a coded block as a first codeword (Part I) by LDPC-encoding the L1 pre-signaling information and default L1 static information having a fixed number of bits among the determined control information and transmits the first codeword in step 502. In step 503, the transmitter determines whether the generated control information includes additional L1 static information. In the absence of the additional L1 static information, the transmitter generates a codeword being a coded block by LDPC-encoding the L1 configurable information and L1 dynamic information having a variable number of bits and transmits the codeword in step 504. If the L1 configurable information and L1 dynamic information have a large number of bits, they can be transmitted in a plurality of code blocks, i.e. in a plurality of codewords.

In the presence of the additional L1 static information in step 503, the transmitter generates a codeword by LDPC-encoding the additional L1 static information together with the L1 configurable information and the L1 dynamic information and transmits the codeword in step 505. If the sum of the L1 configurable information and the L1 dynamic information is a large number of bits, they can be transmitted in a plurality of codewords. After step 504 or 505, the transmitter repeats the above operation for a next frame in step 506.

Figure 6:
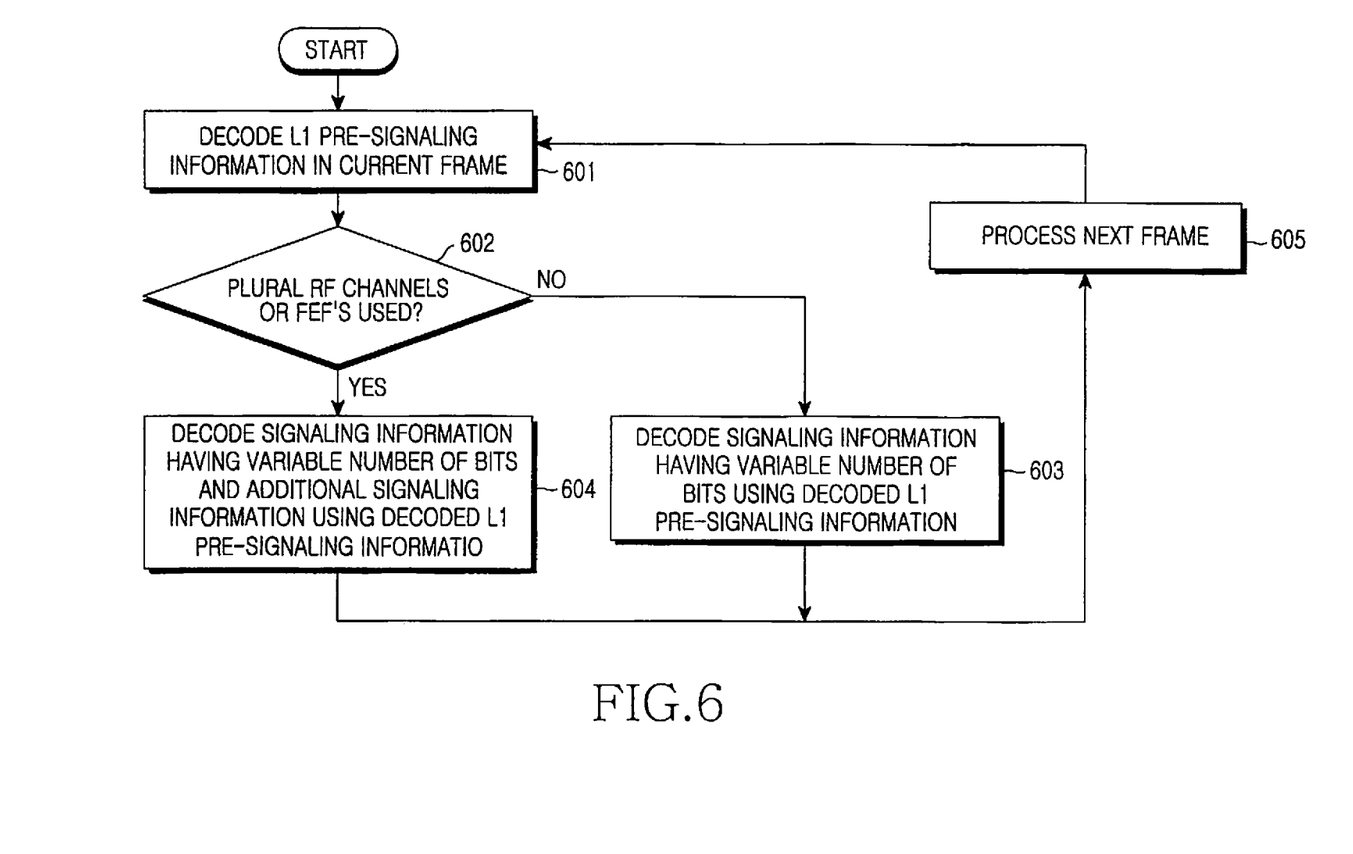
FIG. 6 is a flowchart illustrating a method for receiving control information in a receiver in the wireless communication system according to an embodiment of the present invention.

FIG. 6 is a flowchart illustrating a method for receiving control information in a receiver in the wireless communication system according to an embodiment of the present invention.

Referring to FIG. 6, the receiver acquires L1 pre-signaling information and default L1 static information by decoding the coded block (Low Density Parity Check (LDPC) block) of a first codeword in a received current frame in accordance with predetermined subcarriers, code rate, and modulation scheme in step 601. In step 602, the receiver determines, based on the acquired information, whether a plurality of RF channels or an FEF is used. The determination of step 602 is about whether additional L1 static information exists. If additional L1 static information does not exist in step 602, the receiver receives a second codeword of Part II in the current frame using the positions of subcarriers, the code rate, and the modulation scheme of Part II acquired from the L1 pre-signaling information and acquires L1 configurable information and L1 dynamic information from the second codeword of Part II in step 603. If determining that the additional L1 static information exists in step 602, the receiver receives a second codeword of Part II in the current frame using the positions of subcarriers, the code rate, and the modulation scheme of Part II acquired from the L1 pre-signaling information and acquires the additional L1 static information, the L1 configurable information, and the L1 dynamic information from the second codeword of Part II in step 604. In step 605, the receiver repeats the above operation for a next frame.

Figure 7:
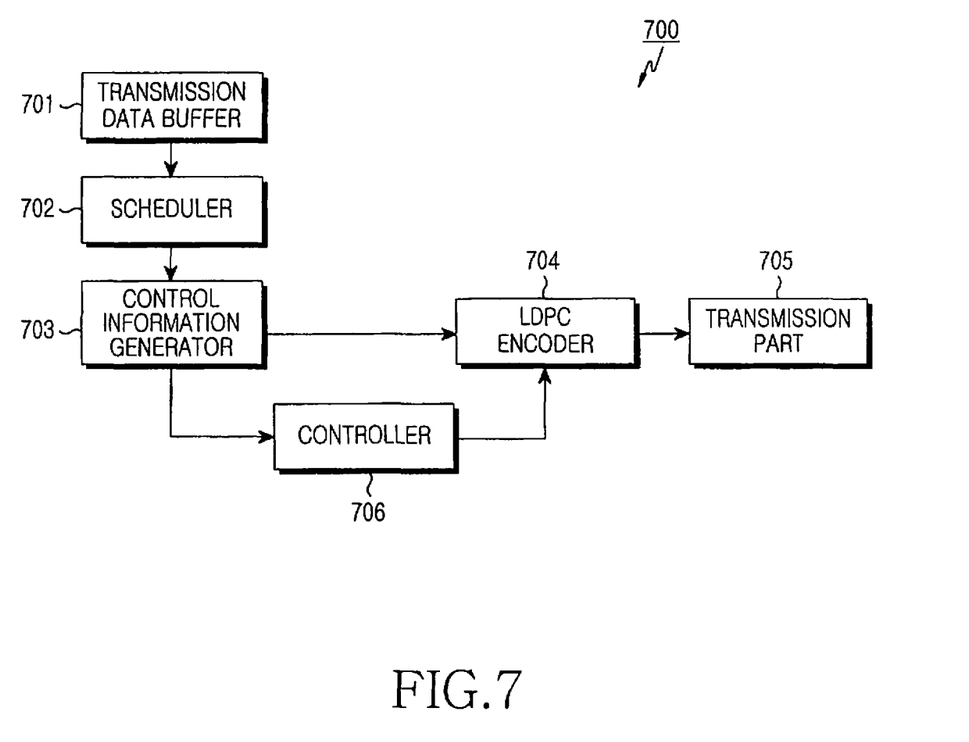
FIG. 7 is a block diagram of the transmitter in the wireless communication system according to an embodiment of the present invention.

FIG. 7 is a block diagram of the transmitter in the wireless communication system according to an embodiment of the present invention.

Referring to FIG. 7, a transmitter 700 includes a transmission data buffer 701, a scheduler 702, a control information generator 703, an LDPC encoder 704, a transmission part 705, and a controller 706. In accordance with the present invention, control information, that is, physical layer signaling information transmitted from the transmitter 700 is divided into L1 pre-signaling information with a fixed number of bits, and L1 configurable information and L1 dynamic information with a variable number of bits. The L1 variable information and the L1 dynamic information are referred to as L1-post signaling information.

The transmission data buffer 701 buffers service data (i.e. PLPs) to be transmitted on a plurality of broadcasting service channels, when a broadcasting service is provided in the wireless communication system. The scheduler 702 performs a predetermined scheduling operation based on information about the buffered data received from the transmission data buffer 701. The scheduling operation involves determining the L1 pre-signaling information, the L1 configurable information, and the L1 dynamic information as control information to be transmitted in a frame. The control information generator 703 receives the result of the scheduling operation and generates field values for the L1 pre-signaling information, the L1 configurable information, and the L1 dynamic information that have been described in detail with reference to FIG. 4. The LDPC encoder 704 receives the control information from the control information generator 703, generates a coded block (LDPC block) from the signaling information with the fixed number of bits and generates at least one coded block from the signaling information with the variable number of bits. The transmission part 705 transmits the LDPC blocks received from the LDPC encoder 704 according to predetermined subcarrier positions, code rate, and modulation scheme. The controller 705 provides overall control to the transmitter 700 in order to generate and transmit LDPC blocks in the method of FIG. 5.

Figure 8:
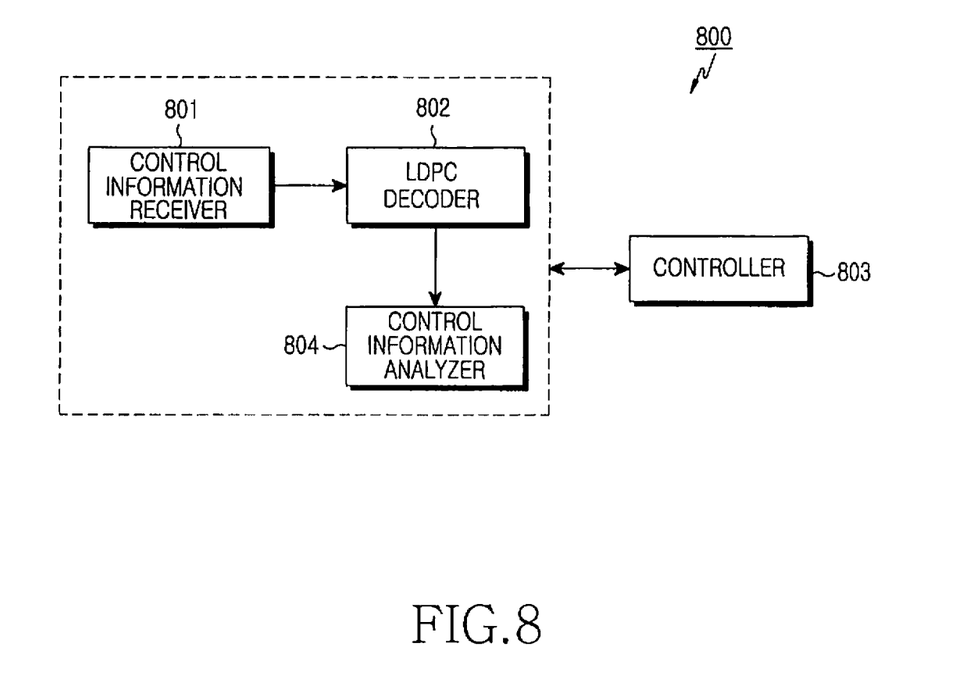
FIG. 8 is a block diagram of the receiver in the wireless communication system according to an embodiment of the present invention.

FIG. 8 is a block diagram of the receiver in the wireless communication system according to an embodiment of the present invention.

Referring to FIG. 8, a receiver 800 includes a control information receiver 801, an LDPC decoder 802, a control information analyzer 804, and a controller 803. The control information receiver 801 receives control information, that is, L1 signaling information including L1 pre-signaling information, L1 configurable information, and L1 dynamic information according to predetermined subcarrier positions, code rate, and modulation scheme and demodulates the L1 signaling information. The LDPC decoder 802 decodes the demodulated L1 signaling information in the method described in FIG. 6 and outputs the decoded information to the control information analyzer 804 which analyzes the decoded control information. The controller 803 provides overall control to the receiver 800 to receive and decode LDPC blocks in the method of FIG. 6.

As is apparent from the above description, the embodiments of the present invention can transmit and receive control information more efficiently by decreasing the number of dummy bits, when the control information is encoded and transmitted. Especially when control information, that is, physical layer signaling information is transmitted in a plurality of LDPC codewords, a codeword having a fixed number of bits is transmitted and received according to the types of control information. Therefore, a transmitter and a receiver are simplified in structure.

Embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, function programs, codes, and code segments for accomplishing the present invention can be easily construed as within the scope of the invention by programmers skilled in the art to which the present invention pertains.

While the invention has been shown and described with reference to certain embodiments of the present invention thereof, it will be understood by those skilled in the art that various changes in form and details may be made therein without departing from the spirit and scope of the present invention as defined by the appended claims and their equivalents.

What is claimed is:

1. A method for transmitting control information in a digital broadcasting/communication system, the method comprising the steps of:
   determining signaling information for a physical layer to be transmitted in a frame;
   generating a coded block from signaling information having a fixed number of bits included in the signaling information for the physical layer; and
   transmitting the frame including the coded block,
   wherein the signaling information having the fixed number of bits includes information required for receiving signaling information having a variable number of bits; and
   wherein the signaling information having the fixed number of bits includes information representing a number of Radio Frequency (RF) channels, and the signaling information having the variable number of bits includes information representing a frequency for each of the RF channels, respectively.

2. The method of claim 1, wherein the signaling information having the fixed number of bits includes Layer 1 (L1) pre-signaling information that remains constant in the signaling information for the physical layer.

3. The method of claim 2, wherein the L1 pre-signaling information includes information indicating at least one of subcarriers, a modulation scheme, and a code rate used for transmission of the signaling information having the variable number of bits.

4. The method of claim 1, wherein the frame includes service data, and wherein the signaling information having the variable number of bits includes information required for receiving the service data.

5. The method of claim 1, wherein the signaling information having the fixed number of bits includes information indicating whether a Further Extension Frame (FEF) is used.

6. The method of claim 1, wherein the signaling information having the fixed number of bits includes information about a cell IDentifier (ID), a network ID, a system ID, and an RF index.

7. The method of claim 1, wherein the frame includes at least one Physical Layer Pipe (PLP) as service data, and when the at least one PLP is transmitted on a plurality of RF channels, the signaling information having the variable number of bits includes information about frequencies of other RF channels except for a frequency of a first RF channel.

8. The method of claim 1, wherein the signaling information having the variable number of bits includes information related to a Further Extension Frame (FEF) reserved for future use.

9. The method of claim 1, wherein the generation comprises generating the coded block by Low Density Parity Check (LDPC)-encoding the signaling information having the fixed number of bits.

10. An apparatus for transmitting control information in a digital broadcasting/communication system, the apparatus comprising:
an encoder for encoding received information in a predetermined coding scheme;
a transmitter for transmitting a frame over a wireless network; and
a controller for controlling the encoder to generate a coded block by encoding signaling information having a fixed number of bits included in signaling information for a physical layer and controlling the transmitter to transmit the frame including the coded block,
wherein the signaling information having the fixed number of bits includes information required for receiving signaling information having a variable number of bits; and
wherein the signaling information having the fixed number of bits includes information representing a number of Radio Frequency (RF) channels, and the signaling information having the variable number of bits includes information representing a frequency for each of the RF channels, respectively.

11. The apparatus of claim 10, further comprising a control information generator for generating the signaling information for the physical layer to be transmitted in the frame according to predetermined scheduling.

12. The apparatus of claim 10, wherein the signaling information having the fixed number of bits includes Layer 1 (L1) pre-signaling information that remains constant in the signaling information for a physical layer.

13. The apparatus of claim 12, wherein the L1 pre-signaling information includes information indicating at least one of subcarriers, a modulation scheme, and a code rate used for transmission of the signaling information having the variable number of bits.

14. The apparatus of claim 10, wherein the frame includes service data, and
wherein the signaling information having the variable number of bits includes information required for receiving the service data.

15. The apparatus of claim 10, wherein the frame includes at least one Physical Layer Pipe (PLP) as service data, and when the at least one PLP is transmitted on a plurality of RF channels, the signaling information having the variable number of bits includes information about frequencies of other RF channels except for a frequency of a first RF channel.

16. The apparatus of claim 10, wherein the signaling information having the variable number of bits includes information related to a reserved Further Extension Frame (FEF).

17. The apparatus of claim 10, wherein the encoder Low Density Parity Check (LDPC)-encodes the signaling information having the fixed number of bits.

18. A method for transmitting control information in a digital broadcasting/communication system, the method comprising the steps of:
determining signaling information for a physical layer to be transmitted in a frame;
generating at least one coded block from signaling information having a variable number of bits included in the signaling information for the physical layer; and
transmitting the frame including the at least one coded block,
wherein the frame includes signaling information having a fixed number of bits required for receiving the signaling information having the variable number of bits; and
wherein the signaling information having the fixed number of bits includes information representing a number of Radio Frequency (RF) channels, and the signaling information having the variable number of bits includes information representing a frequency for each of the RF channels, respectively.

19. The method of claim 18, wherein the frame includes service data and the signaling information having the variable number of bits includes information required for receiving the service data.

20. The method of claim 18, wherein the signaling information having the fixed number of bits includes information indicating whether a Further Extension Frame (FEF) is used.

21. The method of claim 18, wherein the signaling information having the fixed number of bits includes information about a cell IDentifier (ID), a network ID, a system ID, and an RF index.

22. The method of claim 18, wherein the frame includes at least one Physical Layer Pipe (PLP) as service data, and when the at least one PLP is transmitted on a plurality of RF channels, the signaling information having the variable number of bits includes information about frequencies of other RF channels except for a frequency of a first RF channel.

23. The method of claim 18, wherein the signaling information having the variable number of bits includes information related to a reserved Further Extension Frame (FEF).

24. The method of claim 18, wherein the signaling information having the variable number of bits includes Layer 1 (L1) configurable information having a lower probability for change in an upcoming frame and L1 dynamic information having a high probability for change in every frame among the signaling information for the physical layer.

25. The method of claim 18, wherein the signaling information having the fixed number of bits includes Layer 1 (L1) pre-signaling information that remains constant in the signaling information for the physical layer.

26. The method of claim 18, wherein the generation comprises generating the at least one coded block by Low Density Parity Check (LDPC)-encoding the signaling information having the variable number of bits.

27. An apparatus for transmitting control information in a digital broadcasting/communication system, the apparatus comprising:
an encoder for encoding received information in a predetermined coding scheme;

a transmitter for transmitting a frame over a wireless network; and a controller for controlling the encoder to at least one coded block by encoding signaling information having a variable number of bits included in signaling information for a physical layer and controlling the transmitter to transmit the frame including the at least one coded block, wherein the frame includes signaling information having a fixed number of bits required for receiving the signaling information having the variable number of bits; and wherein the signaling information having the fixed number of bits includes information representing a number of Radio Frequency (RF) channels, and the signaling information having the variable number of bits includes information representing a frequency for each of the RF channels, respectively.

28. The apparatus of claim 27, further comprising a control information generator for generating the signaling information for the physical layer to be transmitted in the frame according to predetermined scheduling.

29. The apparatus of claim 27, wherein the frame includes service data and the signaling information having the variable number of bits includes information required for receiving the service data.

30. The apparatus of claim 27, wherein the frame includes at least one Physical Layer Pipe (PLP) as service data, and when the at least one PLP is transmitted on a plurality of RF channels, the signaling information having the variable number of bits includes information about frequencies of other RF channels except for a frequency of a first RF channel.

31. The apparatus of claim 27, wherein the signaling information having the variable number of bits includes information related to a reserved Further Extension Frame (FEF).

32. The apparatus of claim 27, wherein the signaling information having the variable number of bits includes Layer 1 (L1) configurable information having a high probability for change in an upcoming frame and L1 dynamic information having a high probability for changed in every frame among the signaling information for the physical layer.

33. The apparatus of claim 27, wherein the signaling information having the fixed number of bits includes Layer 1 (L1) pre-signaling information that remains constant in the signaling information for the physical layer.

34. The apparatus of claim 27, wherein the encoder Low Density Parity Check (LDPC)-encodes the signaling information having the variable number of bits.

35. A method for transmitting control information in a digital broadcasting/communication system, the method comprising the steps of:

determining signaling information for a physical layer to be transmitted in a frame;

generating a coded block from signaling information having a fixed number of bits included in the signaling information for the physical layer; and generating at least one coded block from signaling information having a variable number of bits included in the signaling information for the physical layer, wherein the signaling information having the fixed number of bits includes information required for receiving the signaling information having the variable number of bits; and wherein the signaling information having the fixed number of bits includes information representing a number of Radio Frequency (RF) channels, and the signaling information having the variable number of bits includes information representing a frequency for each of the RF channels, respectively.

* * * * *